ERROR STOP

CHECK TEST

INVENTOR
WILLIAM McGOVERN

BY Melvin P. Williams
ATTORNEY

BASIC TIMING CHART

OSCILLATOR

June 21, 1966 W. McGOVERN 3,257,546
COMPUTER CHECK TEST
Filed Dec. 23, 1963 6 Sheets-Sheet 5
FIG. 8 MAIN CYCLE CLOCK
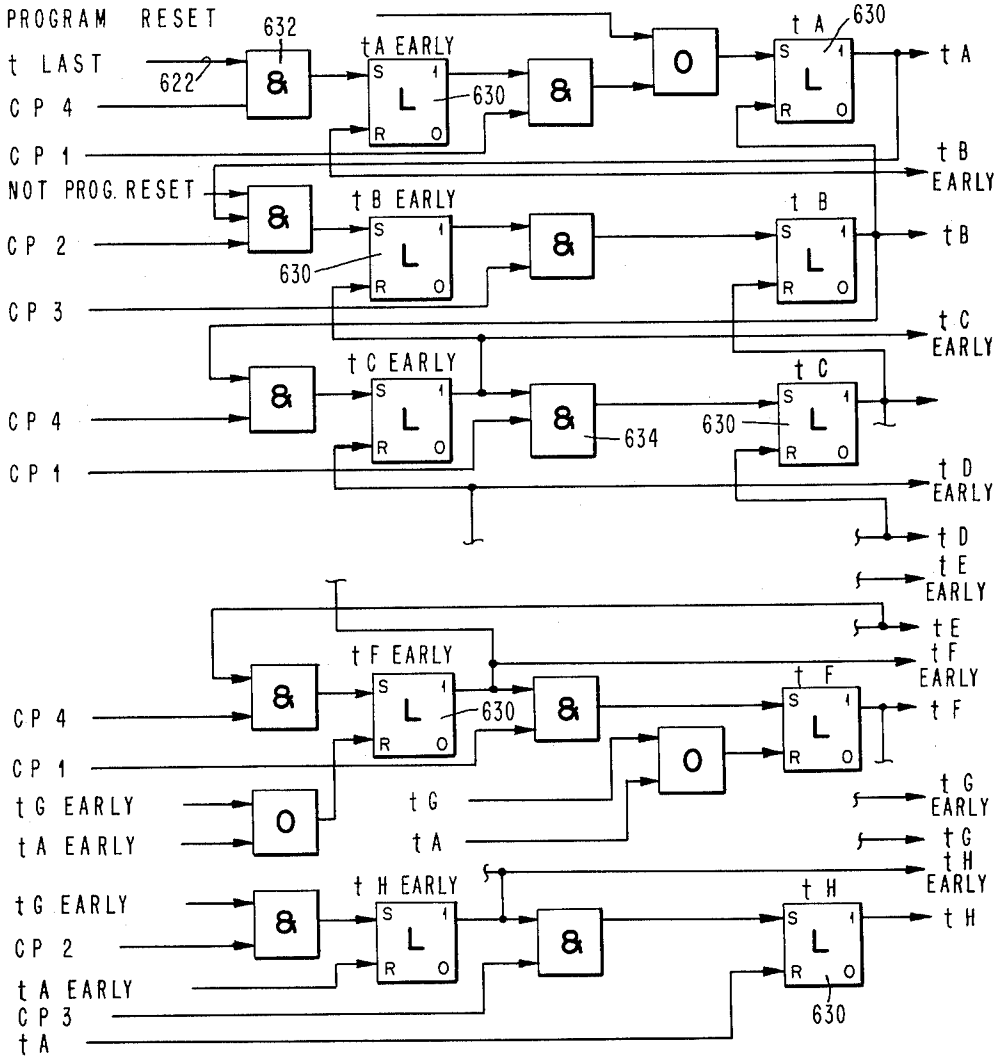
FIG. 9 TIMING NOMENCLATURE EXAMPLES
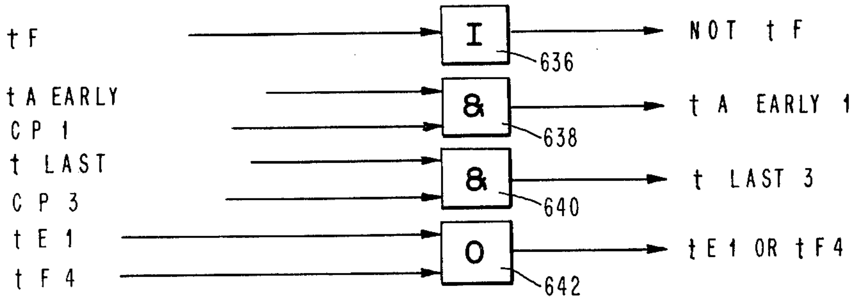

FIG. 10 BINARY GATES FOR CLOCK
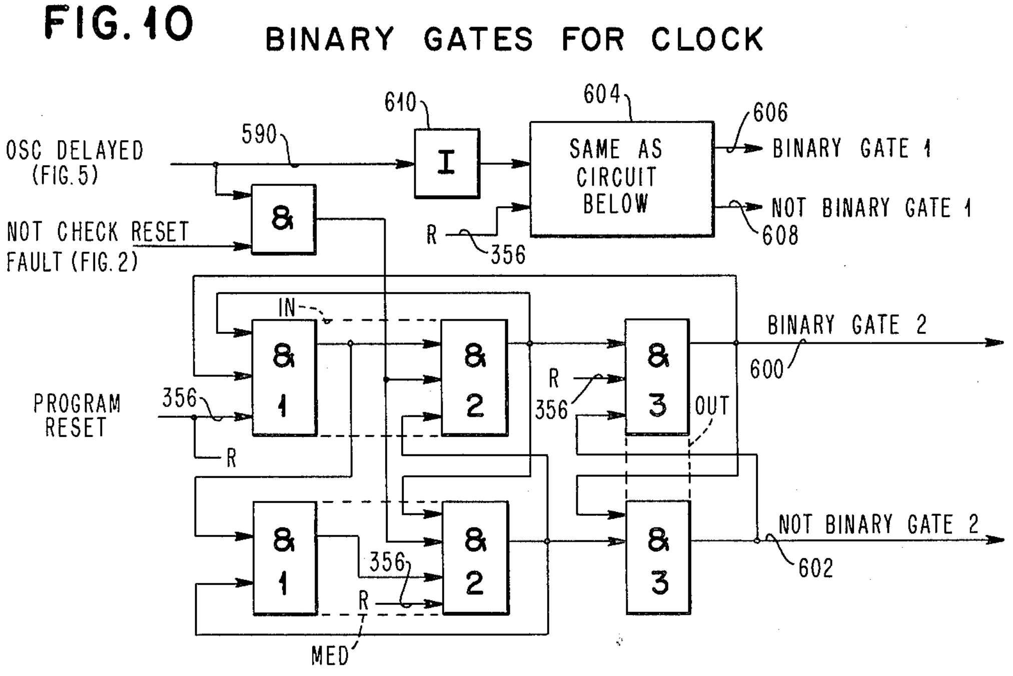
FIG. 11 CLOCK PULSES 1-4
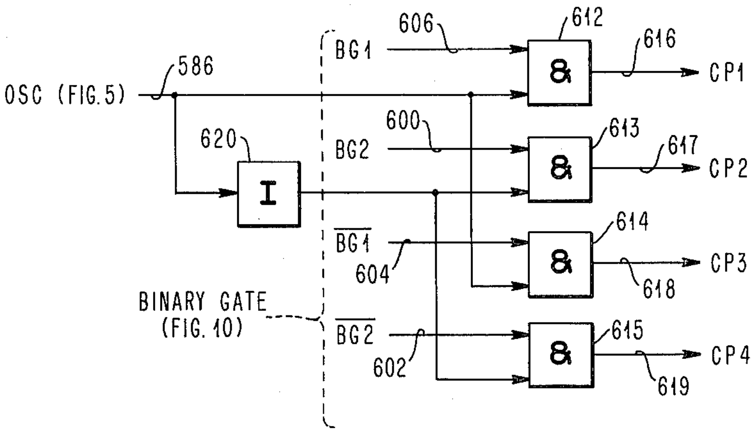

United States Patent Office 3,257,546

Patented June 21, 1966

3,257,546

COMPUTER CHECK TEST

William McGovern, Poughkeepsie, N.Y., assignor to International Business Machines Corporation, New York, N.Y., a corporation of New York Filed Dec. 23, 1963, Ser. No. 332,765
12 Claims. (Cl. 235—153)

This invention relates to data processing machines of the type which have error checking or validity checking circuits therein, and more particularly, to a check test circuit which is capable of determining whether or not the error and/or validity checking circuitry is operating correctly.

It is well known in the data processing art that it is necessary to check the validity of data at various points within a data processing system at regular intervals. This is true due to the great complexity of circuitry which must be utilized in a modern computer. Particularly in areas where human life, or dollar values are involved, a computer must be stopped whenever errors are created by fault within the computer.

Although the use of error and validity checking circuits is well known, there has been relatively few ways of determining whether or not the error and validity checking circuits are themselves operative. In one case, a computer may branch from current work in its program to a test instruction which will force errors into the error checking circuits, and will not proceed on the normal program unless the forced errors are in fact recognized by the error checking circuits. In communication fields, it has been known to apply a test signal, containing faulty codes, during a period between transmission of information signals. The transmission of the test signal is identified by a start-of-message combination which causes the receiver to stop unless it does in fact recognize that the test signal is erroneous. Also, operator-controlled testing of error circuits has been utilized in a great variety of ways.

However, if an operator tests a circuit at 8 o'clock and thereafter hourly all day long, there is still no assurance that several billion computations might not be made in error between the time that one test is made and the time that the next test is made. The same is true of programmed error circuit checks and checks which are inserted between long transmissions of informative data, as described hereinbefore.

Further, although circuits have been perfected to a fairly reliable degree, it is of course possible that the circuitry utilized to test the error checking or validity circuits might itself be in fault.

Therefore, it is a primary object of this invention to provide a check test circuit which will not only test the error and/or validity checking circuits, but will also test itself to determine whether or not it has in fact performed the required test function.

Another object is to provide a check test circuit which is operative during each compute cycle of a data processing system.

A further object is to provide a check test circuit which is fail safe; that is, which will cause a false indication to occur if any one dynamic gating or amplifying stage should fail in either an ON state or an OFF state.

In accordance with the present invention, there is provided means to cause known errors at a particular time in the compute cycle of a data processing system, means responsive to the errors which should be recognized at that time, said means settable to one or another of two stable states, failure to set into one of said states indicating a fault; and additionally there is provided means responsive to lack of said indication at a later time to set said check test means in the other one of said states, and means responsive to the failure of said check test means to assume said second state to indicate a reset fault.

This invention guarantees that so much of the computer which is monitored for valid data must be operating correctly during a compute cycle, or the lack of accuracy will be recognized.

Other objects, features, and advantages of the present invention will become more apparent in the light of the following description of a preferred embodiment thereof as shown in the accompanying drawings.

In the drawings:

FIG. 8 is a simplified schematic block diagram, partially broken away, of a main cycle clock, which may be used in an overall computer clocking system that can be blocked by a CHECK RESET FAULT signal generated by the embodiment of the present invention shown in FIG. 2;

FIG. 9 is illustrative of the timing circuits used in the remaining figures;

FIG. 10 is a schematic block diagram of a circuit to generate clocking gate signals, for combination with oscillator signals so as to generate the clock pulses of FIG. 11, as shown in FIG. 4, in dependence upon no CHECK RESET FAULT;

FIG. 11 is a schematic block diagram of a circuit for combining oscillator and gate signals so as to generate clock pulses.

Figure 1:
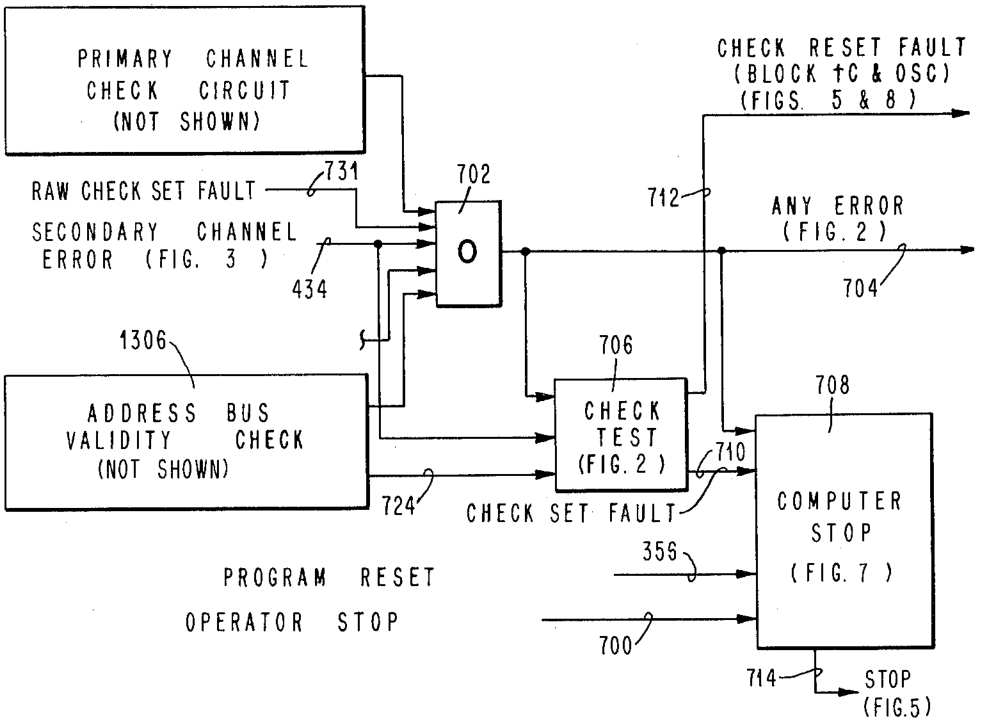
FIG. 1 is a simplified block diagram of an ERROR STOP circuit within which the present embodiment may be used.

The present invention is illustrated in a commonly-owned copending application of Richard S. Carter and Walter W. Welz entitled "Parallel Memory, Multiple Processing, Variable Word Length Computer," filed on even date herewith, Serial No. 332,648. In said copending application is disclosed a complete computing system including the present embodiment, and all the illustrative material which is disclosed herein. The reference numerals to the various items have been kept the same in this application so as to permit easy cross reference to said copending application. The details of any circuits, and a complete embodiment of an environment in which the present invention may be utilized is illustrated in said copending application.

In accordance with one embodiment of the present invention, a CHECK TEST circuit (FIG. 2) responsive to ERROR circuits (such as the parity check circuit 432 shown in FIG. 3) will operate an ERROR STOP circuit and a COMPUTER STOP circuit (FIGS. 1 and 7), block an OSCILLATOR (FIG. 5) and stop a clock gating circuit (FIG. 10) whenever the error checking circuits of a computer are not known to be operating properly.

The manner in which a CHECK SET FAULT signal (712, FIG. 2), a CHECK RESET FAULT signal (710, FIG. 2), and other error signals are actually used to cause machine shutdown is the subject matter of a commonly owned copending application of Richard S. Carter, James C. Cooper and Walter W. Welz, entitled "Computer Clock Phase Lock," Serial No. 332,766, filed on even date herewith.

Figure 2:
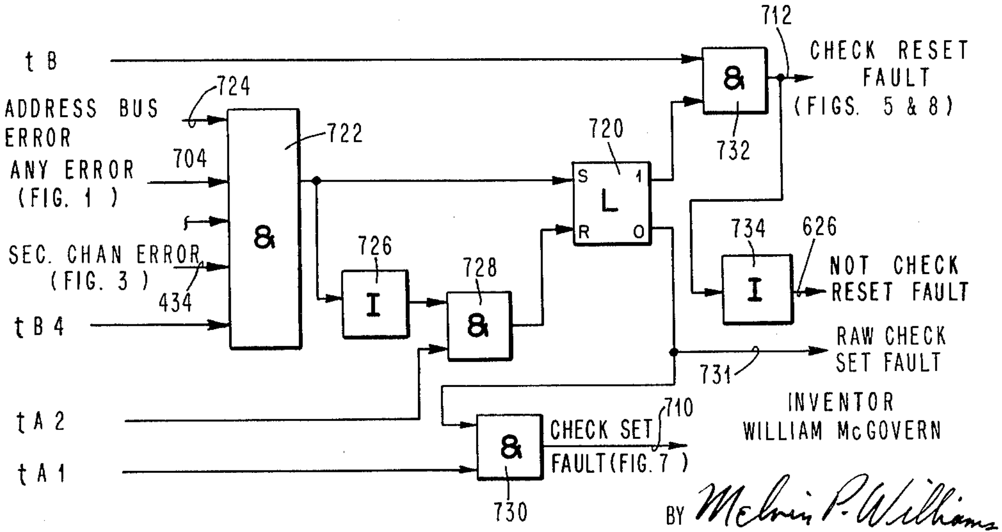
FIG. 2 is a schematic block diagram of a CHECK TEST circuit in accordance with the present invention.

In FIG. 1 is shown a block diagram of an ERROR STOP circuit, within which the present embodiment may be used. Therein, an OR circuit 702 may respond to a plurality of circuits to generate an ANY ERROR signal on a line 704. For instance, the OR circuit 702 may respond to PRIMARY CHANNEL ERROR circuits (not shown elsewhere herein) to RAW CHECK SET FAULT on a line 731 (from FIG. 2), to ADDRESS BUS VALIDITY CHECK circuits (shown in FIG. 115 of the copending application), or to a SECONDARY CHANNEL ERROR signal on a line 434, which is generated in FIG. 3. The ANY ERROR SIGNAL on line 704 is applied to a CHECK TEST circuit 706 and to a COMPUTER STOP circuit 708. These circuits will be described in successive paragraphs. The CHECK TEST circuit 706 also responds to the ADDRESS BUS VALIDITY CHECK circuit 1306 and to the SECONDARY CHANNEL ERROR signal on line 434, and operates to generate a CHECK SET FAULT signal on a line 710 and a CHECK RESET FAULT signal on a line 712 (which is symbolic also of the NOT CHECK RESET FAULT signal on line 626, as shown in FIG. 2). The COMPUTER STOP circuit 708 responds to the ANY ERROR signal on line 704, the CHECK SET FAULT signal on line 710, a PROGRAM RESET signal on a line 356, and an OPERATOR STOP signal on a line 700. The COMPUTER STOP circuit 708 generates a STOP signal on a line 714.

The CHECK TEST circuit 706 is shown in FIG. 2. The object of this circuit is to insure that the ordinary validity and error checking circuitry, throughout a system, is operating correctly; that is, to insure that lack of an error signal means that there has been no errors, and cannot mean that perhaps one of the error checking circuits is itself disabled.

Figure 6:
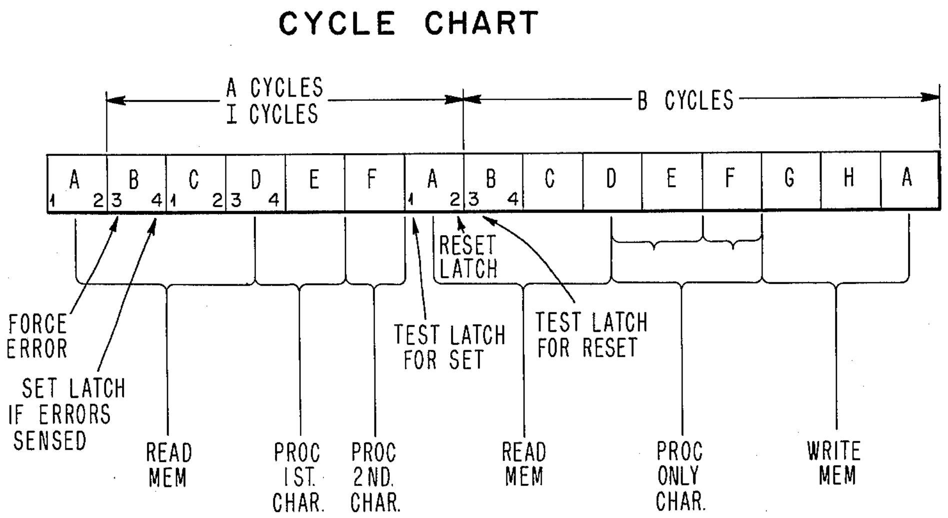
FIG. 6 is a cycle chart illustrating the timing of the present invention.

The CHECK TEST circuit of FIG. 2 comprises essentially a latch 720 which is set by an AND circuit 722 in response to the ADDRESS BUS ERROR signal on line 724, the ANY ERROR signal on line 704, the SECONDARY CHANNEL ERROR signal on line 434, and time B4 (see FIG. 6 for timing indications). Thus, the concurrent presence of ANY ERROR, ADDRESS BUS ERROR, SECONDARY CHANNEL ERROR (and any other errors as may be provided in a particular embodiment), causes the AND circuit 722 to set the CHECK TEST latch 720. ANY ERROR is applied to the AND circuit 722 to be sure that the error-collecting OR circuit (702, FIG. 1) is not blocked in an inoperative condition. It is to be noted that the AND circuit 722 operates only at time B4; at a later time, when the time B4 input is no longer present, the AND circuit 722 must be disactivated, thereby providing *no* input to an inverter 726, so that there *will* be an input to an AND circuit 728. At a following time, A2, the AND circuit 728 will reset the latch 720.

Thus, the CHECK TEST latch 720 must be set during time B4 due to the concurrent presence of all errors, and must be reset at time A2 due to the lack of an error indication from the AND circuit 722. The reason for this is that all of the checking circuits have errors forced into them during time B4, to be sure that the error checking circuitry can recognize the errors therein. Then, in order to insure that the AND circuit 722 has not been disabled, or frozen, in the ON condition, it is required that the lack of a signal out of the AND circuit 722 will reset the latch, at time A2, by the inverter 726 and the AND circuit 728. Instead of the inverter 726, the lack of an output from AND 722 would (in an actual machine) be used with a —*t*A2 in a negative AND circuit in place of the AND 728. This would enhance failsafe operation of the circuit. An AND circuit 730 is provided to test the out-of-phase output of the latch 720 at time A1; if the latch is *not* set, there will be a signal from said out-of-phase output (RAW CHECK SET FAULT on line 731), and the AND circuit 730 will then generate the CHECK SET FAULT signal on line 710. However, if all circuits are operating properly, then the CHECK TEST latch 720 will be set at time A1 (it having been set at the previous time B4). Immediately following the testing of the latch to see if it is properly set (at time A1), the AND circuit 728 will respond to the time A2 signal to reset the latch. Thereafter at time B in the following cycle, an AND circuit 732 will test the latch to be sure it is reset. If the latch is not reset at the start of time B (which just precedes a second time B4), then the AND circuit 732 will generate a CHECK RESET FAULT signal on line 712. Thus, when errors are forced into the circuit at time B4, the latch should be set if everything is operating properly. At the following time A1, an AND circuit 730 tests the latch and will generate a CHECK SET FAULT signal on line 710 if the latch did *not* set properly. Immediately thereafter, the latch should be reset by AND CIRCUIT 728, and this is tested by AND circuit 732 which will generate a CHECK RESET FAULT signal on line 712 if the latch is not properly *reset* at time B. The CHECK RESET FAULT signal on line 712 is passed to an inverter 734 which generates the NOT CHECK RESET FAULT signal on line 626. In an actual machine, a negative AND circuit would be used in place of the AND circuit 603 (FIG. 10) so as to eliminate the inverter 734, for a more fail-safe operation.

The RAW CHECK SET FAULT signal on line 731 is supplied directly to the ERROR STOP circuit (FIG. 1) so as to cause a general error shut-down, as described hereinafter, in case of failure of the AND circuit 730.

Although the cycle chart of FIG. 6 shows FORCE ERROR in the A and I cycles, the error circuits are forced throughout *every* time B. Similarly, the sets, rests and tests occur at *every* time B4, A2, and A1 and B, respectively.

Figure 3:
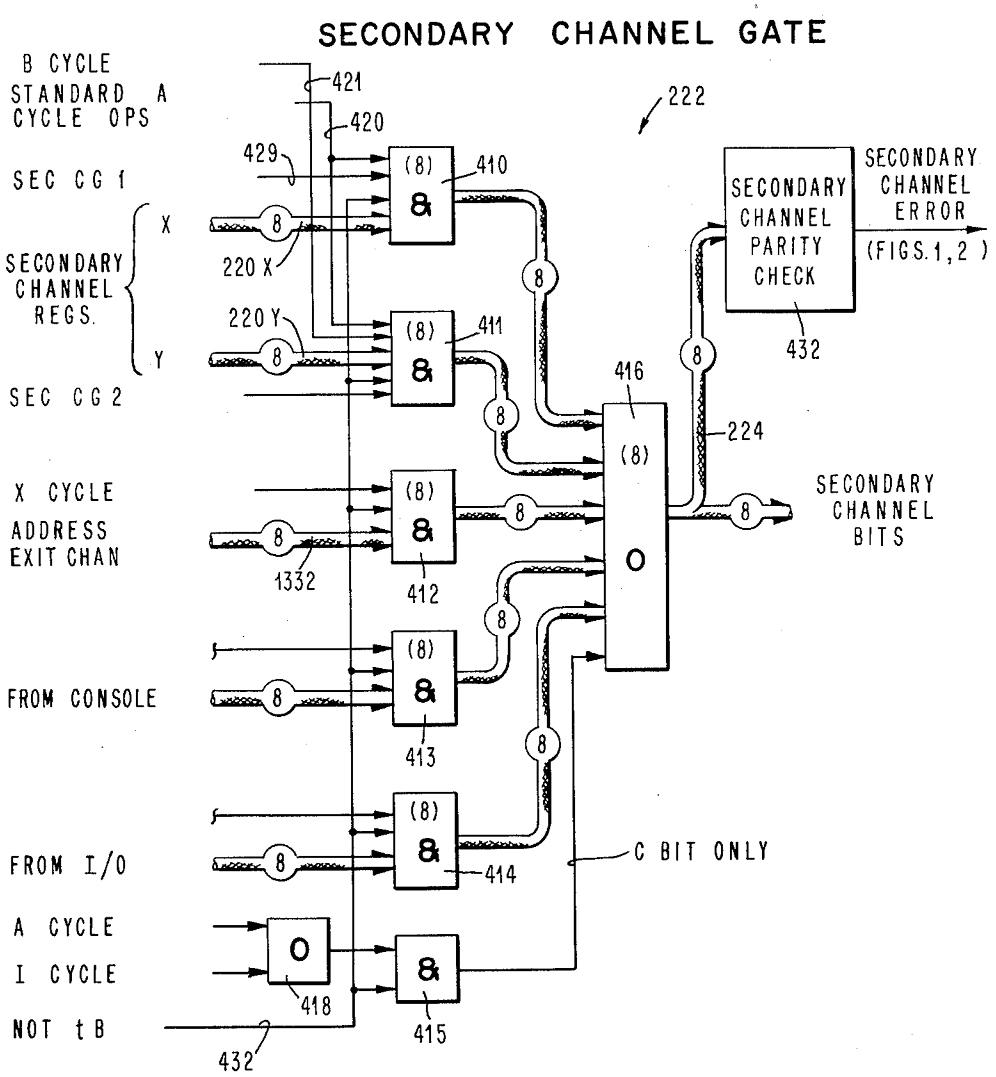
FIG. 3 illustrates a GATE circuit having ERROR CHECKING means, and means for forcing errors at a particular time for use with the embodiment of the invention shown in FIGS. 1 and 2.

The SECONDARY CHANNEL ERROR signal on line 434 is generated in FIG. 3. The SECONDARY CHANNEL GATE comprises a plurality of eight way gates 410–414 which feed in eight way OR circuit 416. The output of the SECONDARY CHANNEL GATE 210 comprises the SECONDARY CHANNEL 224, which includes one bit for each of the bits in a character. For further details, see the aforementioned copending application Serial No. 332,648.

Attached to the SECONDARY CHANNEL is a SECONDARY CHANNEL PARITY CHECK circuit 432 which generates a SECONDARY CHANNEL ERROR on the line 434 whenever there is other than an odd number of bits on the SECONDARY CHANNEL. The SECONDARY CHANNEL PARITY CHECK circuit 432 can be any parity checking circuit well known in the art, the details of which are not important here.

An AND circuit 415 is provided in order to create proper parity on the SECONDARY CHANNEL at times when there is no data actually transferred to the SECONDARY CHANNEL. Thus during an A cycle (450), when A fields are accessed and put into the A registers, and during an I cycle (452), no data is transferred to the SECONDARY CHANNEL. To prevent the appearance of error during this time, a parity bit is caused to go on the CHANNEL by means of the AND circuit 415 together with an OR circuit 418.

The only thing that will block the gates, 410–415 is the presence of time B, which blocking is accomplished by the disappearance of a NOT *t*B signal. This signal is generated by taking the complement of the time B signal, possibly by means of an inverter (not shown), all as is within the skill in the art (see examples, FIG. 9).

Figure 4:
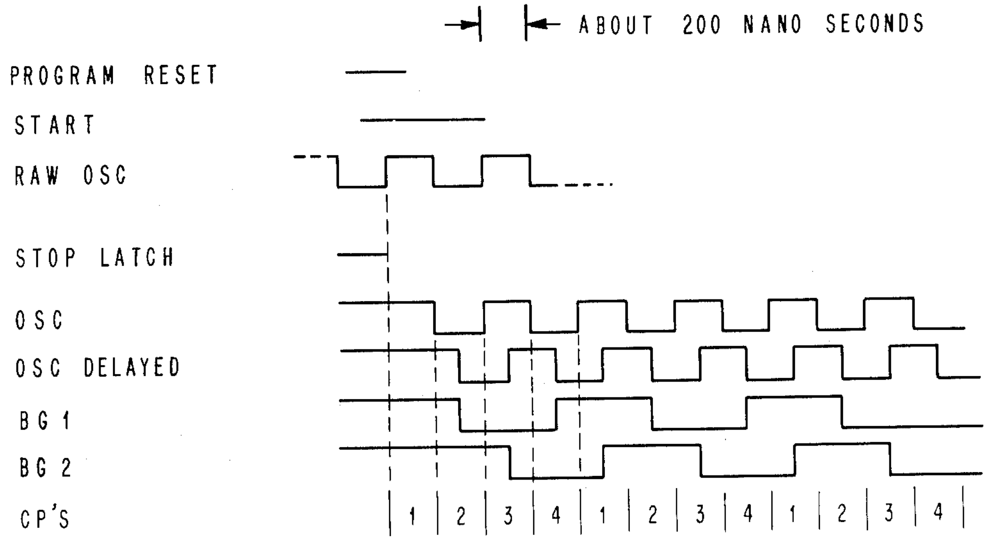
FIG. 4 is a basic timing chart illustrative of the timing of an embodiment within which the present invention may be utilized.

In FIG. 4 is shown a BASIC TIMING CHART which illustrates the relationship of various signals utilized in generating a sequence of four clock pulses. At the bottom of FIG. 4 is shown the clock pulses, which are identified as being 1, 2, 3, 4, 1, 2, 3, 4 etc. These clock pulses are generated (in FIG. 11, hereinafter) by combinations of signals: CP2 is generated in response to negative OSCILLATOR and positive binary gate 2 (BG2); CP3 is generated in response to positive OSCILLATOR and negative BG1; CP4 is generated in response to negative OSCILLATOR and negative BG2; and CP1 is generated in response to positive OSCILLATOR and positive BG1. The circuits which actually develop the OSCILLATOR and binary gate signals, and combine these so as to generate the clock pulses are discussed in detail in the copending application, Section 11. The remainder of the BASIC TIMING CHART of FIG. 4 illustrates the manner in which the basic timing signals resume operation in a known phase relationship following a program reset or error stop, and restarting of the system. This will be described in detail along with the circuits, in a later section.

Figure 5:
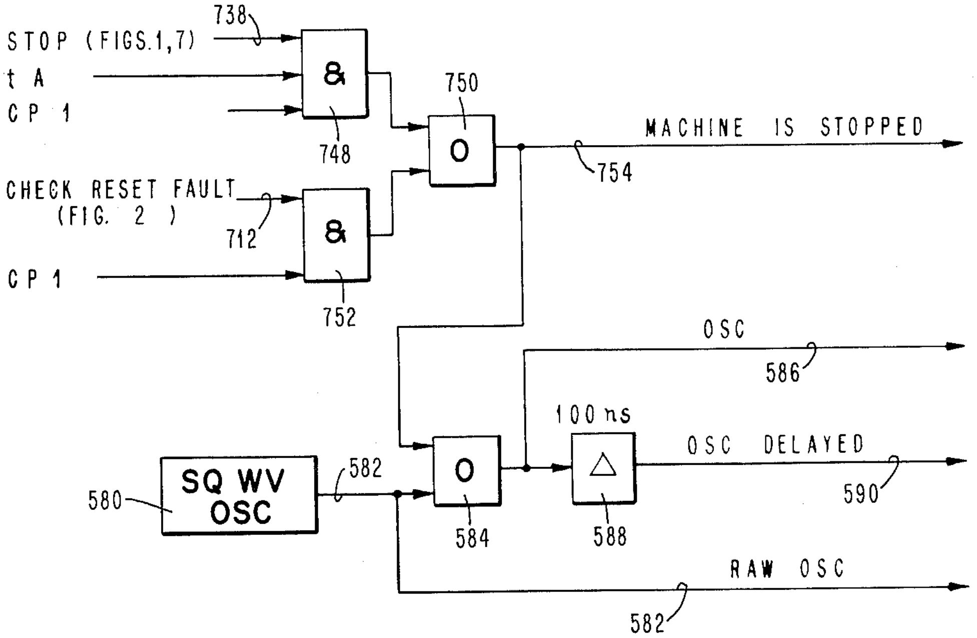
FIG. 5 is a schematic block diagram of an OSCILLATOR circuit which may be blocked by a false signal derived in accordance with the presence invention.

The basic OSCILLATOR circuit is shown in FIG. 5. At the bottom left hand side of FIG. 5 is shown a SQUARE WAVE OSCILLATOR 580 which may be of any well known type having a period of approximately 400 nanoseconds; this will give a positive portion followed by a negative portion each of about 200 nanoseconds, as illustrated in the top of the BASIC TIMING CHART in FIG. 4. The details of the SQUARE WAVE OSCILLATOR 580 are not shown because any square wave oscillator known to the prior art, capable of operating at that frequency, is suitable.

The output of the SQUARE WAVE OSCILLATOR 580 on a line 582 comprises a RAW OSCILLATOR signal on a line 582. This RAW OSCILLATOR SIGNAL is also fed to an OR circuit 584, the output of which comprises an OSCILLATOR signal on line 586 which is fed to certain other circuitry and to a delay circuit 588; the delay circuit 588 supplies a delay of approximately 100 nanoseconds, and generates thereby an OSCILLATOR DELAYED signal on a line 590. The remainder of the circuits in FIG. 5 are described hereinafter, with respect to the stop circuitry.

Figure 7:
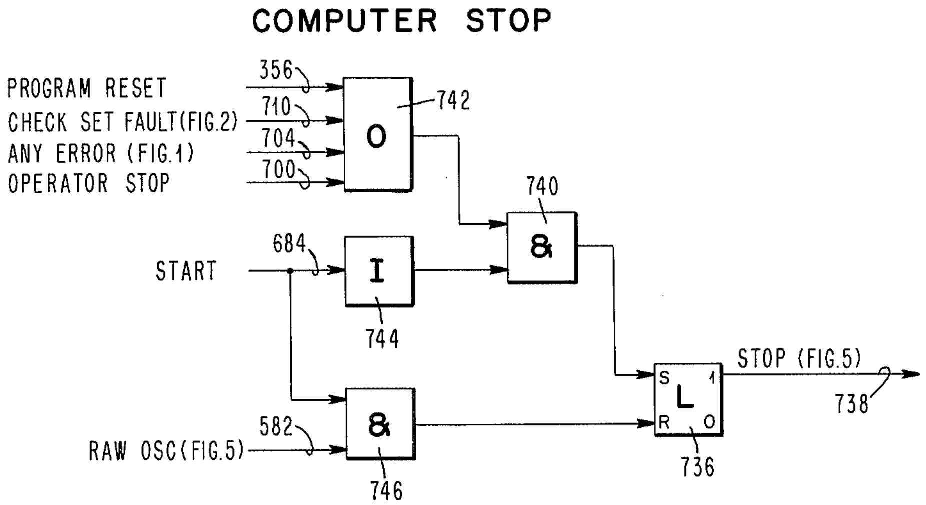
FIG. 7 is a computer stop circuit which may be operated by a check set fault signal from the embodiment of the present invention illustrated in FIG. 2.

A STOP signal on a line 738 is generated in FIG. 7 by a latch 736 which is set by an AND circuit 740 in response to an OR circuit 742 and an inverter 744. The OR circuit 742 responds to any one of the following: PROGRAM RESET on line 356; CHECK SET FAULT on line 710; ANY ERROR on line 704; and OPERATOR STOP on line 700. The inverter 744 responds to the START signal on line 684. Thus, the latch 736 will be set any time that the START signal is not present, whenever there is any one of the four inputs to the OR circuit 742. The latch 736 is reset by an AND circuit 746 in response to the START signal and the RAW OSCILLATOR signal on line 582. The purpose of the AND circuit 746 is to guarantee that a start condition can be initiated only during the positive portion of RAW OSCILLATOR; this insures phase-locking of the circuitry as described hereinbefore, so that CP1 will be the first clock pulse to be generated once the computer is started by the resetting of the STOP signal latch 736.

Returning now to the OSCILLATOR circuit of FIG. 5, the STOP signal on line 738 is applied to an AND circuit 748 together with time A and CP1. Thus, the AND circuit will deliver a signal to an OR circuit 750 at time A1, whenever the STOP signal appears on line 738. The OR circuit 750 can also respond to an AND circuit 752 due to the concurrent presence of the CHECK RESET FAULT signal on line 712 and CP1. Therefore, whenever there is a CHECK RESET FAULT, the OR circuit 750 will be activated; this will be shown hereinafter to occur at what would normally be time C early 1. The output of the AND circuit 750 comprises a MACHINE IS STOPPED signal on line 754, which is applied to the OR circuit 584, described hereinbefore. The purpose of applying the MACHINE IS STOPPED signal to the OR circuit 584 is to cause the oscillator to be apparently frozen in the positive oscillator condition whenever the machine is, in fact, stopped. Thus, starting of the machine always takes place with positive OSCILLATOR on line 586 and positive OSCILLATOR DELAYED on line 590. Notice that RAW OSCILLATOR on line 582 continues to follow the SQUARE WAVE OSCILLATOR 580 so as to provide proper gating for the START signal on line 684 (FIG. 7) in order to permit it to reset the stop latch. It is the disappearance of the STOP signal on line 738 (FIG. 7) which actually causes the machine to begin running again. The MACHINE IS STOPPED signal on line 754 may be utilized as necessary throughout the system to indicate the fact that no computation may be achieved due to the stopping of the oscillator itself, which stopping of the oscillator is actually accomplished by forcing the OSCILLATOR and OSCILLATOR DELAYED signals positive, by means of the OR circuit 584.

Referring now to FIG. 10, a BINARY GATES FOR CLOCK circuit generates the BG1 and BG2 signals as well as the NOT BG1 (or negative BG1) and NOT BG2 signals which are all utilized in FIG. 11 to generate the clock pulses CP1–CP4. BG1 and BG2 may be considered to be first and second timing pedestal signals, respectively, as they are utilized to generate the clock pulses in FIG. 11. In FIG. 10, the OSCILLATOR DELAYED SIGNAL (590) is applied to an AND circuit 603 which permits passing of the OSCILLATOR DELAYED signal only when there is a NOT CHECK RESET FAULT signal on line 626 (from FIG. 2). The OSCILLATOR DELAYED signal on line 590 also feeds an inverted 610 which causes the negative of OSCILLATOR DELAYED to drive the BG1 circuit 604. The operation of the circuit of FIG. 10 is described in detail in said copending application; it suffices here to understand that the circuit is a frequency divider which is phase-locked with the oscillator in such a fashion that there will be a positive BG1 and a positive BG2 at the time that the computer begins to run following an error stop. The effect of the AND circuit 603 is to block the OSCILLATOR DELAYED signal, thereby preventing a change in BG2 whenever there is a CHECK RESET FAULT, due to the disappearance of the NOT CHECK RESET FAULT signal on line 626.

Referring briefly to the cycle chart of FIG. 6, consider that the CHECK TEST latch is to be reset at time A2 at the end of a first cycle. Throughout time B, the AND circuit 732 (FIG. 2) is gated by a *t*B signal, and, assuming that the latch has not been reset (due to a fault in the check test circuit), there will be a CHECK RESET FAULT signal on line 712. This will cause the inverter 734 to cease generating the NOT CHECK RESET FAULT signal on line 626. At the start of time B3 (FIG. 4), BG1 is negative and BG2 is positive. Referring to FIG. 10, since the OSCILLATOR DELAYED signal is applied directly to the inverter 610, BG1 can change, but BG2 can no longer change. Thus, the circuit of FIG. 10 will continue to provide the positive BG2 signal throughout time B, due to the operation of the CHECK TEST circuit in FIG. 2. The CHECK RESET FAULT signal is also applied to the OSCILLATOR circuit of FIG. 5. This signal will cause the MACHINE IS STOPPED signal on line 754, and cause the OR circuit 584 to force the OSCILLATOR and OSCILLATOR DELAYED signals into a steady positive condition. However, the CHECK RESET FAULT will not operate the AND circuit 752 until CP1. Referring to the BASIC TIMING CHART of FIG. 4, and to the CLOCK PULSES 1–4 circuit of FIG. 11, it will be seen that when BG1 is frozen positive at time 3, the next negative swing of the OSCILLATOR (which looks like it will occur a time 4) will actually cause the generation of CP2, due to the fact that positive BG2 and negative OSCILLATOR cause an AND circuit 613 (FIG. 11) to generate CP2. The next thing that will occur is that BG1 and the oscillator both go positive, thus causing CP1 to be generated. As soon as CP1 is available to the AND circuit 752 (FIG. 5) the OR circuit 750 causes the OR circuit 584 to force the OSCILLATOR signals positive. Therefore, the machine is shut down, with BG1 ON, BG2 ON (FIG. 10), and CP1 being generated, due to the fact that the OSCILLATOR is forced positive by the OR circuit 584. In order to achieve this, the clock counted as follows: A1, A2, B3, B2, B1. This is so because the MAIN CYCLE CLOCK cannot advance into time C EARLY without CP4, and CP4 cannot be generated with negative BG2.

Thus there has been described a combination of timing signals and start-stop signals together with the CHECK TEST CIRCUITRY of FIG. 2 which controls the starting, stopping, checking and running of the machine, and which keeps all of these functions phase-locked in such a fashion that whenever the machine is started, CP1 will be the first clock pulse to be generated, as shown in the basic timing chart of FIG. 4. This in turn guarantees that time A will be set whenever the machine is restarted as is illustrated in the main cycle clock discussion with respect to FIG. 8, hereinafter.

The main cycle clock causes the division of actual operating cycles into logic times, so that the various steps may proceed in an orderly manner. The cycle clock runs from a time A to a time F unless the memory is to be loaded, in which case it runs from time A to time H. Running through the cycle clock is considered to be either an instruction cycle (I cycle) or an execution cycle (A, B, or X cycles); the execution cycles can be either of the memory loading type (such as a B cycle within which a result must be written into memory) or of the type where there is no loading of memory required (such as an A cycle wherein the memory is regenerated as the characters are handled in preparation for a following B cycle).

FIG. 8 shows the MAIN CYCLE CLOCK which generates a series of early times and times, including times designated from A through H and corresponding times EARLY A through EARLY H. The circuit shown in FIG. 8 is essentially a ring circuit wherein one stage goes on and permits the next stage to go on at a subsequent clock pulse time, and as a stage goes on it resets an earlier stage. For instance, stage *t*B EARLY will reset stage *t*A EARLY. This is discussed in detail in said copending application. Setting of stage *t*B is effected by the combination of *t*B EARLY having been set, and CP3 being applied. The mere fact that *t*B comes on, automatically turns off *t*A.

When the STOP signal disappears from line 738, the OSCILLATOR will be unblocked. The clock will advance from CP1, to CP2 and CP3; but since the MAIN LOGIC CLOCK is still set to time B EARLY and time B, the CHECK RESET FAULT can still be sensed; therefore the BG2 generator is still blocked. Thus, the clock will next generate CP2 and CP1 (in that reverse order) in the same way as when the initial stop occurred at CP1, the OSCILLATOR will be blocked. However, if the PROGRAM RESET switch is pressed (FIG. 39, sheet 24 of said copending application), the MAIN CYCLE CLOCK is reset to *t*A, so that a complete new cycle can be performed.

The details of the MAIN CYCLE CLOCK are discussed more fully in Section 11 of said copending application.

In order to simplify the description, the timing signals are combined in such a way as to specify an exact time, as illustrated in FIG. 9. For instance, if an occurrence is to be permitted at all times *except* during a particular time, it might be indicated as, for instance, NOT *t*F; it is to be understood that such a time may be generated by taking the out-of-phase output of any one of the latches shown in FIG. 8, or by passing the timing signal, such as *t*F, through an inverter, such as the inverter 636 in FIG. 9. Similarly, any clock pulse may be combined with any logic time so as to generate a signal such as *t*A EARLY 1 by means of an AND circuit 638. Also, the timing signal *t* LAST may be combined with clock pulses so as to specify a particular portion of *t* LAST; this may be achieved by an AND circuit such as AND circuit 640 which generates *t* LAST 3. It should be understood that any combinations of signals, or the complements of the signals, may be made throughout the embodiment, and the generation of these signals is, in most cases, left to the skill of the art.

The foregoing embodiment is particularly concerned with first blocking the BG2 signal (a second timing pedestal), thereafter forcing the OSCILLATOR and OSCILLATOR DELAYED signals positive, and then causing the STOP circuit of FIG. 7 to be reset only during positive RAW OSCILLATOR. The circuits shown are exemplary only, and it is possible to utilize the positive and negative portions of the square wave multivibrator in such a fashion that the resulting signals may be considered to be first oscillator and second oscillator, one being the inverse of the other, thereby eliminating the inverter 626 which feeds the BG1 (a first timing pedestal) generating circuit as shown in FIG. 10. Other simplifications and improvements might be devised, the particular embodiments shown herein being developed for simplicity of illustration of the invention.

What is claimed is:

1. In a cyclically operative data processing system of the type having a timing means, a check test apparatus, comprising:

error checking means for checking the validity of data being handled in said system and for producing error signals in response to the invalidity of the data;

check test means settable into either one of two stable states, said means being set when in a first state, and being reset when in a second state;

set means responsive to said timing means to force error indications in said error checking means at least once in each cycle and to respond to the error signals which result therefrom to set said check test means;

and set fault means responsive to said check test means for testing said check test means to determine whether or not said check test means is set, said set fault means generating a check set fault signal in response to a reset condition of said check test means.

2. In a cyclically operative data processing system, including timing means for controlling the operation thereof, a check test apparatus, comprising:

error checking means for checking the validity of data being handled in said system and for producing error signals in response to the invalidity of the data;

check test means settable into either one of two stable states, said means being set when in a first state, and being reset when in a second state;

set means responsive to said timing means to force error indications in said error checking means and to respond to the error signals which result therefrom to set said check test means;

set fault means responsive to said check test means for testing said check test means to determine whether or not said check test means is set, said set fault means generating a check set fault signal in response to a reset condition of said check test means;

reset means responsive to said timing means for resetting said check test means;

and reset fault means responsive to said check test means for testing said check test means to determine whether or not said check test means is reset, said reset fault means generating a check reset fault signal in response to a set condition of said check test means.

3. In a data processing system of the type having timing means including means for subdividing each cycle into a plurality of times, a check test apparatus, comprising:

error checking means for checking the validity of data being handled in said system and for producing error signals in response to the invalidity of the data;
check test means settable into either one of two stable states, said means being set when in a first state, and being reset when in a second state;
set means responsive to said timing means to force error indications in said error checking means at least once in each cycle and to respond to the error signals which result therefrom to set said check test means;
and set fault means responsive to said timing means and to said check test means for testing said check test means after the operation of said set means to determine whether or not said check test means is set, said set fault means generating a check set fault signal in response to a reset condition of said check test means.

4. In a cyclically operative data processing system, a check test apparatus, comprising:
timing means including means for subdividing each cycle into a plurality of times by a sequence of time signals, and means for subdividing each time into a plurality of clock times by clock pulse signals;
error checking means for checking the validity of data being handled in said system and for producing error signals in response to the invalidity of the data;
check test means settable into either one of two stable states, said means being set when in a first state, and being reset when in a second state;
set means responsive to said timing means to force error indications in said error checking means and to respond to the error signals which result therefrom to set said check test means;
set fault means responsive to said timing means and to said check test means for testing said check test means after the operation of said set means to determine whether or not said check test means is set, said set fault means generating a check set fault signal in response to a reset condition of said check test means;
reset means responsive to said timing means for resetting said check test means;
and reset fault means responsive to said timing means and to said check test means for testing said check test means after the operation of said reset means to determine whether or not said check test means is reset, said reset fault means generating a check reset fault signal in response to a set condition of said check test means.

5. The device described in claim 4 further comprising:
means responsive to said check reset fault signal and operative on said timing means for altering the generation of said clock pulse signals.

6. In a cyclically operative data processing system, a check test apparatus, comprising:
error checking means for checking the validity of data being handled in said system and for producing error signals in response to the invalidity of the data;
check test means settable into either one of two stable states, said means being set when in a first state, and being reset when in a second state;
set means for forcing error indications in said error checking means and to respond to the error signals which result therefrom to set said check test means;
set fault means responsive to said check test means for testing said check test to determine whether or not said check test means is set, said set fault means generating a check set fault signal in response to a reset condition of said check test means;
reset means for resetting said check test means;
reset fault means responsive to said check test means for testing said check test means to determine whether or not said check test means is reset, said reset fault means generating a check reset fault signal in response to a set condition of said check test means;
and timing means for causing said set means and said reset means to operate alternatively in a cyclic fashion, for causing said set fault means to operate after said set means and before said reset means, and for causing said reset fault means to operate after said reset means and before said set means.

7. In a cyclically operative data processing system, a check test apparatus, comprising:
a plurality of error checking means for checking the validity of data being handled in said system and for producing corresponding error signals in response to the invalidity of related data;
check test means settable into either one of two stable states, said means being set when in a first state, and being reset when in a second state;
error collecting means responsive to said error checking means for generating an all-errors signal in response to the presence of an error signal from each of said error checking means, said all-errors signal being applied to said check test means to set said check test means into said first state;
and means responsive to said error collecting means for setting said check test means in said reset state in response to the absence of said all-errors signal.

8. In a cyclically operative data processing system, a check test apparatus, comprising:
timing means including means for subdividing each cycle into a plurality of times by a sequence of time signals, and means for subdividing each time into a plurality of clock times by clock pulse signals;
a plurality of error checking means for checking the validity of data being handled in said system and for producing corresponding error signals in response to the invalidity of related data;
means responsive to said timing means for forcing said error checking means to generate error signals at a first time;
check test means settable into either one of two stable states, said means being set when in a first state, and being reset when in a second state;
error collecting means responsive to said error checking means and to said timing means for generating an all-errors signal in response to the presence of an error signal from each of said error checking means at a time during said first time, said all-errors signal being applied to said check test means to set said check test means into said first state;
and reset means responsive to said error collecting means and to said timing means for setting said check test means in said reset state at a later time after said first time in response to the absence of said all-errors signal.

9. The device described in claim 8 additionally comprising:
set fault means responsive to said timing means and to said check test means for testing said check test means at a time after said first time and before said later time to determine whether or not said check test means is set, said set fault means generating a check set fault signal in responsive to a reset condition of said check test means;
and reset fault means responsive to said timing means and to said check test means for testing said check test means at a time after said later time to determine whether or not said check test means is reset, said reset fault means generating a check reset fault signal in response to a set condition of said check test means.

10. The device described in claim 9 additionally comprising:
means responsive to said check reset fault signal for altering the operation of said timing means.

11. In a data processing system of the type within which various means may sense error or failures, and there is provided means for generating a fault signal in response to certain errors or failures, said system being resettable into a running condition by a system resetting signal, said system including a timing control comprising a source of basic alternating timing signals, a stop circuit settable into either one of two stable states for generating a stop signal when set into a first one of said states, clock control means responsive to said source and to said stop signal for generating basic alternating timing signals in response to the absence of said stop signal and for generating a steady signal in response to said stop signal, means responsive to said fault signal for setting said stop means in said first state, and means responsive to said system resetting signals and to said source for resetting said stop signal means in a fashion so that said source is generating a signal equal to the output from said clock control means at the time that said stop signal means is set in said second condition; a check test apparatus, comprising:

timing means including means for subdividing each cycle into a plurality of times by a sequence of time signals, and means for subdividing each time into a plurality of clock times by clock pulse signals;

error checking means for checking the validity of data being handled in said system and for producing error signals in response to the invalidity of the data;

check test means settable into either one of two stable states, said means being set when in a first state, and being reset when in a second state;

set means responsive to said timing means to force error indications in said error checking means and to respond to the error signals which result therefrom to set said check test means;

set fault means responsive to said timing means and to said check test means for testing said check test means after the operation of said set means to determine whether or not said check test means is set, said set fault means generating a check set fault signal in response to a reset condition of said check test means;

reset means responsive to said timing means for resetting said check test means;

reset fault means responsive to said timing means and to said check test means for testing said check test means after the operation of said reset means to determine whether or not said check test means is reset, said reset fault means generating a check reset fault signal in response to a set condition of said check test means;

timing signal means responsive to said clock control means and to said reset means for generating time signals and clock pulse signals for said system;

and means responsive to said check reset fault signal and operative on said timing means for altering the generation of said clock pulse signals.

12. In a data processing system of the type within which various means may sense errors or failures in said system, and within which there is provided means for generating a stop producing signal in response to certain errors or failures, said system being resettable into a running condition by a system resetting signal, a timing control comprising:

a source of basic timing signals;

a stop circuit settable into either one of two stable states for generating a stop signal when set into a first one of said states;

clock control means responsive to said source and to said stop signal for generating basic timing signals in response to the absence of said stop signal and for generating a steady signal in response to said stop signal;

a first timing pedestal generator responsive to said clock control means for generating a first timing pedestal signal in response to said basic timing signals;

an AND circuit responsive to said clock control means;

a second timing pedestal generator responsive to said AND circuit for generating second timing pedestal signals in response to said basic timing signals;

means responsive to said clock control means and to said pedestal generators for generating a first pair of clock pulses in response to said first timing pedestal signals and for generating a second pair of clock pulses in response to said second timing pedestal signals;

check test means for checking the operation of the error circuits within the said system;

and fault means for checking the operation of said check test means, said fault means generating a signal for blockng said AND circuit in response to absence of an indication of proper operation of said check test means, thereby to alter the generation of said second pair of clock signals without affecting the operation of said clock control means.

No references cited.

MALCOLM A. MORRISON, *Primary Examiner.*

ROBERT C. BAILEY, *Examiner.*

I. FAIBISCH, *Assistant Examiner.*